J. C. COOKE.
WELDING WROUGHT IRON PLATES.
No. 27,697. Patented Apr. 3, 1860.
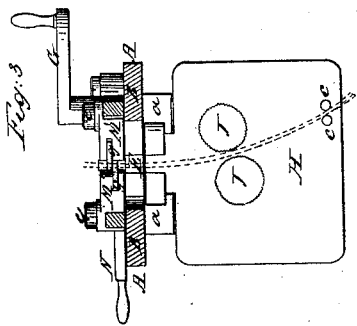
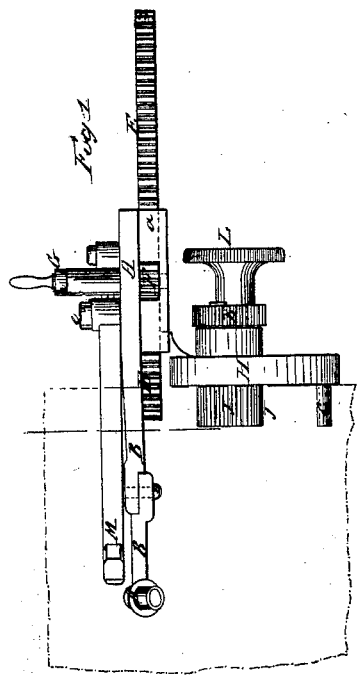
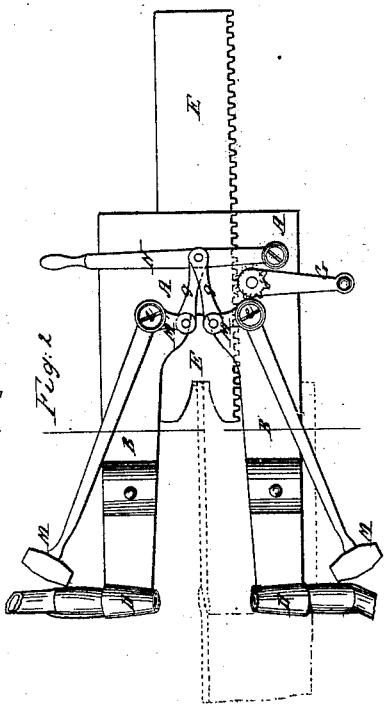

UNITED STATES PATENT OFFICE.

J. C. COOKE, OF MIDDLETOWN, CONNECTICUT.

WELDING WROUGHT-IRON.

Specification of Letters Patent No. 27,697, dated April 3, 1860.

*To all whom it may concern:*

Be it known that I, J. C. COOKE, of Middletown, in the county of Middlesex and State of Connecticut, have invented a new and useful Improvement in Welding Together Wrought-Iron Plates; and I do hereby declare that the following is a full, clear, and exact description thereof, reference being had to the accompanying drawings, forming a part of this specification, in which—

Figure 1, represents a side section of the hammers and gas tubes showing the method of clamping the same to the edge of wrought iron plate, and giving to them a universal movement while clamped to the plank for the purpose of directing both, the hammers, and flames of the gas over the surfaces of plates to be welded. Fig. 2, is a plan view of Fig. 1, showing the hammers and gas tubes and the rack and pinion for giving them a longitudinal movement, also the method of giving both hammers a simultaneous movement, when two hammers are used. Fig. 3, is a transverse section taken through Figs. 1 and 2, as indicated by the red lines marked thereon. This figure shows twin rollers for clamping the apparatus to the plates, and shows the guide pins for keeping the whole firm and steadily attached to the plates. These parts are in a position for forging curved plates such as ships planking, or skins or boiler plates, etc., the curved line of the plate is shown in red ink.

Similar letters of reference indicate corresponding parts in the three figures.

The object of this invention is to enable large planks or plates of wrought iron to be welded together. The intention is to weld such plates that cannot be brought to the forge and conveniently handled so as to be readily heated to the welding point and then united—such for instance as the iron planking or skins for ships, for large sheet iron tanks, for buoys, steam boilers, and the like, much of which work cannot under the present method of welding be done with a smith's furnace or forge, and the consequence is, that the work is done by riveting the plates together with a loss of one third of the strength of metal.

My object is to weld such large plates, together in such a manner that nearly the entire shell of a vessel might be constructed in a single piece of malleable iron, that plane or curved plates may be united with equal facility and that the welding of large plates may be accomplished with the same ease and perfection, as smaller ones in the ordinary method of welding.

For this purpose my invention consists in the employment of a suitable portable apparatus which may be clamped at any convenient point to the sheets of metal undergoing the operation of welding, and which may be rigidly held in place when required or moved along as the operation proceeds, which may be clamped to plates of various thickness, or of any curvature, which apparatus consists of one, two or more suitable hammers or pressure rollers, and a suitable heating media, for heating the surfaces to be welded to the "welding point" at the same time excluding atmospheric air, so that the surfaces will not oxidize. The hammers or rollers are to be so arranged that they can be easily operated, and so that they can be made to effect the welding at the proper time or at the instant the proper degree of heat is attained. The apparatus should then be constructed so that it will be under complete control of the operator and so that it may be directed along the seam with readiness and accuracy, and at the same time so that it will have a fixedness and rigid hold on the plates; the invention therefore, in short, consists in a means of moving the fire to the work, instead of the work to the fire.

To enable those skilled in the art to fully understand my invention I will proceed to describe its construction and operation.

The ordinary method of welding, the iron is placed into a furnace or smith's forge, and the surfaces or edges are heated to a pasty or just melting condition termed the "welding point" the edges are then brought together and (being free from all scale or dirt) pressed, rolled, or hammered into one solid piece. This operation is accompanied with some difficulty, for should the edges scale, their union could not be effected, and to remedy this scale produced by atmospheric air impinging on the iron, while in a heated state, the smith will throw sand on the iron which melts into glass and so shuts out the atmosphere, but brings into contact with the metal the coal with sulfur and other impurities. To remedy the formation of scale on the iron I employ flame, which, by a suitable arrangement, hereinafter to be described, is made to impinge on the surfaces, and thus shut out the atmosphere; and this flame is brought in contact with both sides of both surfaces of the metal to be welded, and the metal is heated to the "welding point" in such a manner that the hammers or rollers, will form the union of the plates as fast as this heat is attained, they should therefore be so arranged and adjusted with relation to the flame or "burners" that they will act with certainty and precision in their operation. For this purpose I construct an apparatus of any suitable capacity consisting of a bed plate A, terminating in two arms B, B, the length of which may be equal to the width of the largest plates used, on the extreme ends of which arms are placed, inclining upward, suitable gas tubes D, D, which direct the flame upon the surfaces of the metal to be welded, as shown by the drawings, Fig. 2. These gas tubes may be made adjustable on the arms B, B, so that the greatest intensity of heat may be obtained. Now to each of these tubes or nozzles is to be attached flexible tubes which communicate with a reservoir of gas, these flexible tubes should be of sufficient length to admit of the various motions to be given to the apparatus during welding.

The arms B, B, with their nozzles and the base plate A, are supported upon a rack bar E, and held down to this bar by the guiding jaws $a$, $a$, which project from the under side of plate A, and through which pass the rack bar E. The arms, with plate A, are to be moved by a toothed pinion F, which engages with the teeth of bar E, and the pinion may be rotated by a hand wheel or a crank $g$, or by any other means. The rack bar E, is attached near its front end (which end is crotched as shown by Figs. 2 and 3 to receive the edge of the plate) to a right angular plate H, against which the sheet metal abuts, when the apparatus is clamped to it. J, J, are twin rollers and clamps, the surfaces of which are serrated in a direction with their axes so as to prevent their slipping while on the plate to be welded, the shafts of these have suitable bearings in plate H, and they are rotated simultaneously by spur wheels K, and hand wheel L; one of the shafts of these rollers J, J, is acted upon by a strong spring so that the rollers may be yielding and accommodate themselves to uneven plates, or plates of different thickness. Between these rollers J, J, and projecting from plate H, are two pins $c$, $c$, which serve as guides and holding pins. These should be moved over the surface of plate H, for welding plates of different curvatures. These pins with the pressure rollers J, J, serve to clamp the apparatus to the plates to be welded and at the same time allow the entire apparatus to be raised or depressed on the plate as the work of welding progresses.

M, M, represent two hammers reaching out to the nozzles or tubes D, D, with their arms pivoted to the plate A, at $e$, $e$. These hammers have a simultaneous movement imparted to them by means of hand lever N, and jointed arms $g$, $g$, and M', M', and they are brought in contact with the metal plate at the point of the highest degree of heat viz: the welding point. These hammers can be operated very rapidly, so as to effect the welding at the instant the plates are sufficiently heated, but instead of percussion, a rolling pressure may be employed and for this purpose suitable rollers may be arranged on the plate A, or arms B, B, having a reciprocating movement and the welding done in this way, or one striking hammer may be used, and the opposite surfaces of the plates held against an anvil, still the parts require to be so arranged that the blow or pressure will be directed upon the plates at the proper time, and point.

Now in order to heat the plates properly rapidly, and to prevent the formation of scale in the operation. It has been shown that this could not be done successfully in the forge, even with such plates that could be handled conveniently, on account of the impurities brought into contact with the metal. Therefore, in order to combine with portability, the hydrogen and carbon, producing flame, and heat by impact I propose to use the air-hydrogen, or oxy. hydrogen or other suitable gas and conduct it through the tubes to the nozzles on the arms B, B, of the above described apparatus, so that the flame may be made to impinge on the joints of iron plates in such a manner as not to burn away the sharp edges of the plates, but to cover the surface and prevent the scale, by excluding atmospheric air. Instead of one nozzle, as shown, a combination of gas apertures may be used and a flame of any length produced which by being directed against the surfaces of the plates to be welded, will rapidly produce a welding heat, and a simple pressure suitably applied would readily effect a welded joint, and the metal would become homogeneous.

Thus with an apparatus such as I have described, and by taking advantage of the portability, and the intensity of heat obtained from the combustion of oxygen and hydrogen, or atmospheric air, and hydrogen, or other suitable heating materials, I am enabled to effect the welding of large unwieldy planks, or plates of metal, with great facility and perfection, and thus the objectionable practice of riveting may be dispensed with, and a strength and a durability may be obtained hitherto unaccomplished.

I am aware that the welding of small plates of wrought metal has been effected by the employment of the oxy-hydrogen and air-hydrogen gas flame, for heating the metal to the " welding point," when, they were pressed or rolled, or hammered, into one piece. This method has long been known, but has never been conducted on a large scale or reduced to successful practice.

I do not wish to confine myself to the precise arrangement and construction of the respective parts of the apparatus herein described and represented for it will be readily seen that equivalent devices, and combination of devices will produce the same result, viz: the heating and hammering or rolling, in one machine which is to be clamped to the plates and capable of being moved along the seam thereof as the welding proceeds or upon ways or scaffolding properly arranged.

What I claim as my invention and desire to secure by Letters Patent is:—

The portable welding apparatus constructed and operating upon the principles described; wherein the heating and hammering or rolling operations are suitably combined and placed under the control of the operator substantially as set forth.

JAS. C. COOKE.

Witnesses:
CLINTON SAGE,
T. T. JONES.